United States Patent

[11] 3,585,361

| [72] | Inventors | Samuel R. Rosen<br>Lorain;<br>Alan B. Reighard, Bay Village; Julius S. Drozek, Lorain, all of, Ohio |
|---|---|---|
| [21] | Appl. No. | 834,272 |
| [22] | Filed | June 18, 1969 |
| [45] | Patented | June 15, 1971 |
| [73] | Assignee | Nordson Corporation<br>Amherst, Ohio |

[54] SUPPLY SYSTEM FOR HEATING AND DISPENSING MOLTEN THERMOPLASTIC MATERIAL
8 Claims, 10 Drawing Figs.

[52] U.S. Cl. .................................................. 219/421,
    219/422, 219/441, 219/535, 222/146
[51] Int. Cl. ........................................................F27b 11/06,
    F27d 11/02
[50] Field of Search........................................... 219/422-1-
    0, 424-5, 420, 44.1, 19, 277-8, 535; 18/8; 222/146

[56] References Cited
UNITED STATES PATENTS

| 2,452,367 | 10/1948 | Gangloff.................... | 219/535 X |
| 2,754,346 | 7/1956 | Williams..................... | 219/422 X |
| 2,809,772 | 10/1957 | Weisz......................... | 222/146 |
| 2,957,440 | 10/1960 | Schaefer..................... | 219/240 X |
| 3,257,498 | 6/1966 | Kahn........................... | 219/535 X |
| 3,041,048 | 6/1962 | Heijnis....................... | 18/8 X |
| 3,377,466 | 4/1968 | Paulsen...................... | 219/421 |

FOREIGN PATENTS

| 830,567 | 5/1938 | France ....................... | 219/421 |

*Primary Examiner*— Volodymyr Y. Mayewsky
*Attorney*— Bosworth, Sessions, Herrstrom and Cain ABSTRACT: A system for melting thermoplastic material and supplying the molten material under pressure and at a controlled temperature to one or more applicators. The material is melted in a melting tank and pumped from there through a filter into a manifold for distribution. The pump is a single piston, double acting, sealless pump and is driven by an air motor including appropriate air valves and valve controls. From the manifold the molten material is distributed to one or more heated, insulated hoses, each of which is to be connected at its opposite end to an applicator. The temperature of the material in the melting tank and in each hose is separately thermostatically controlled.

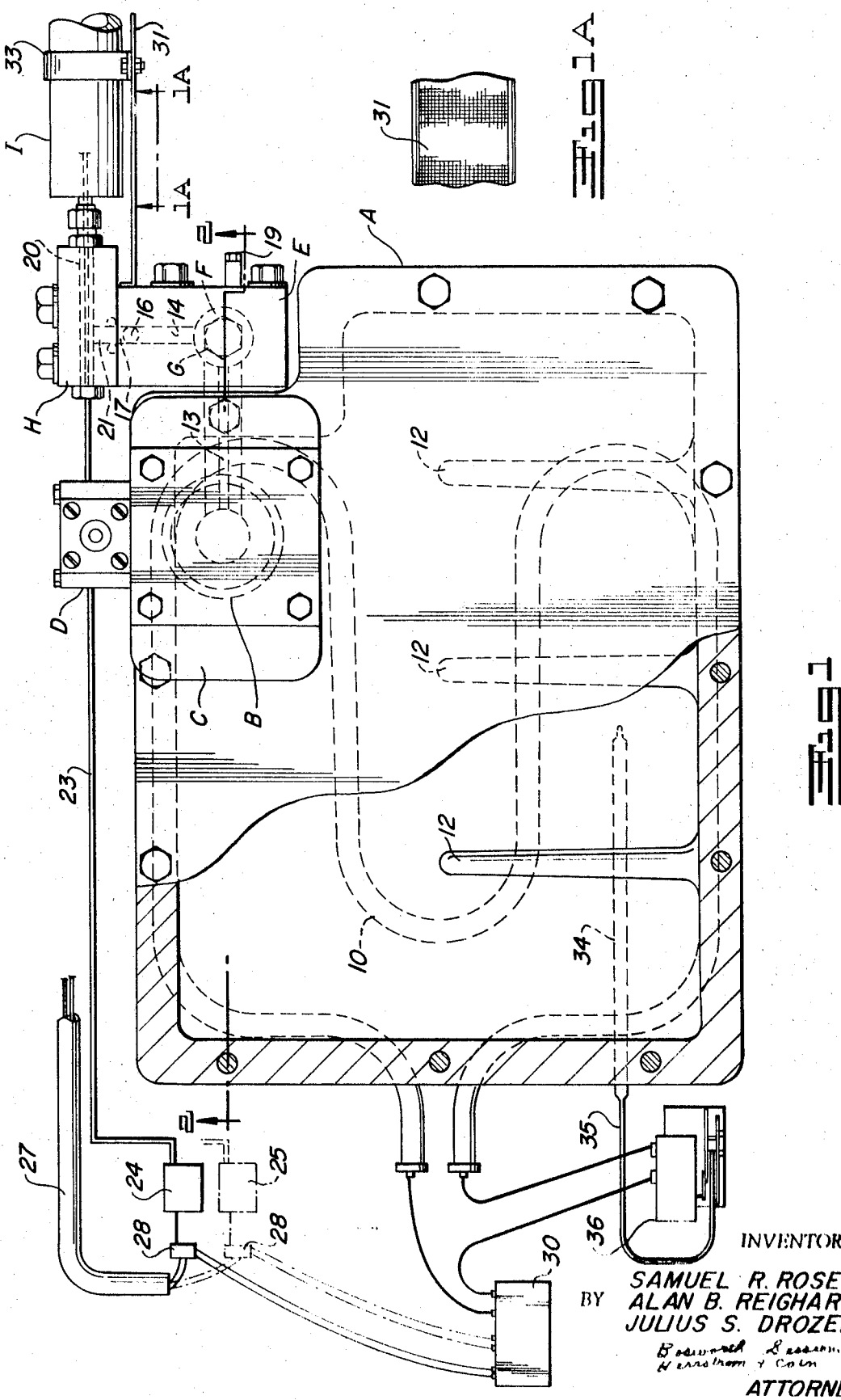

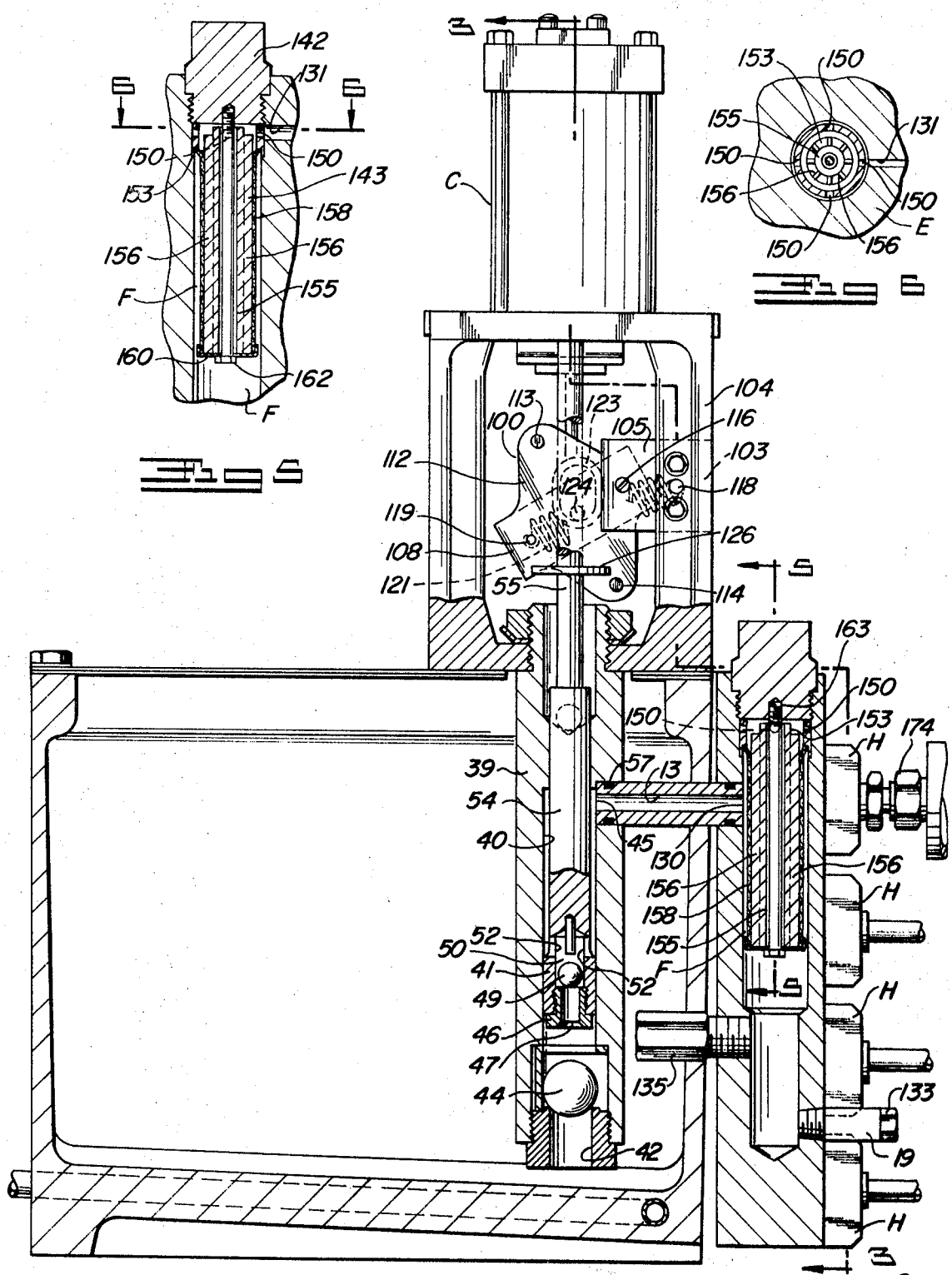

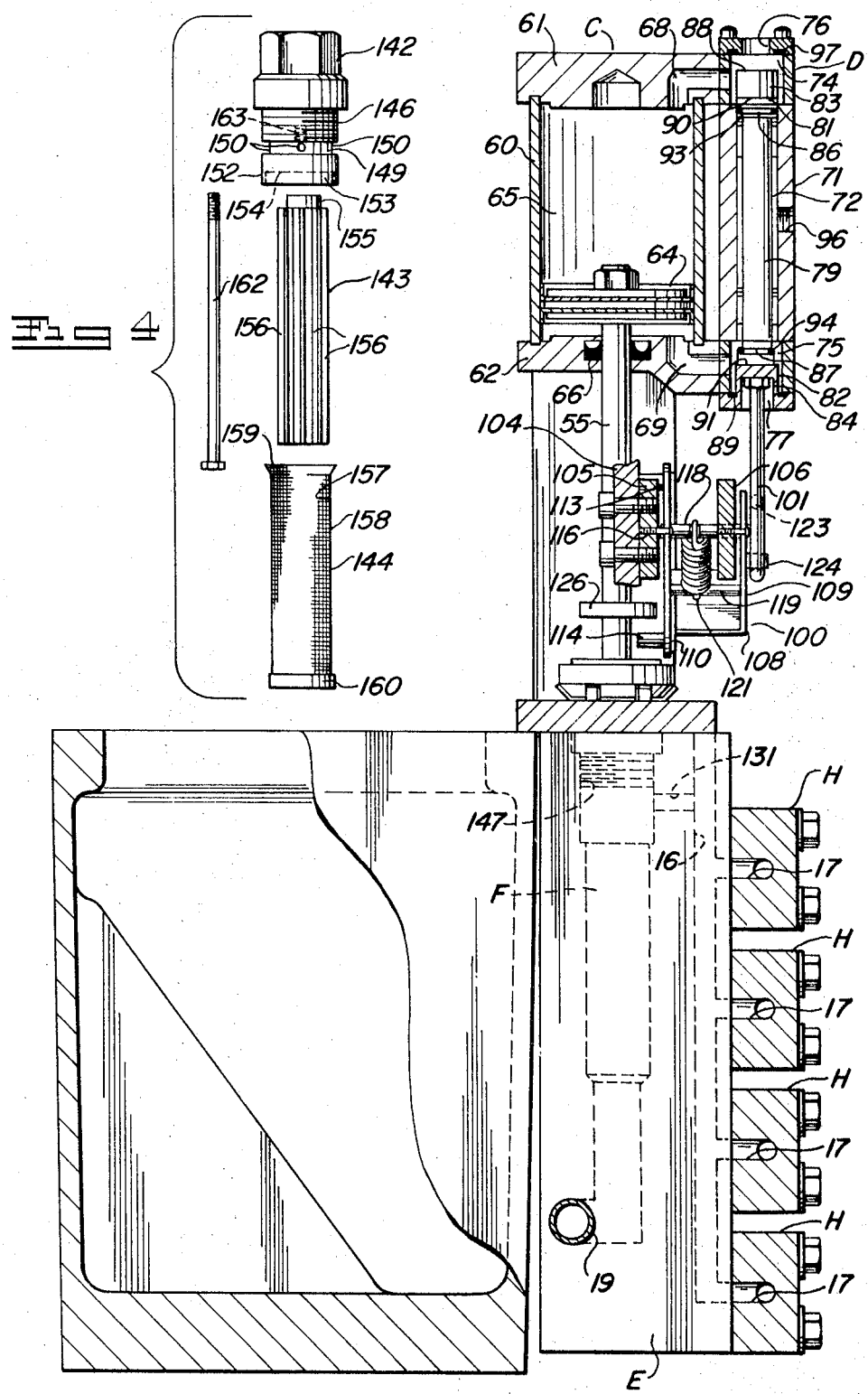

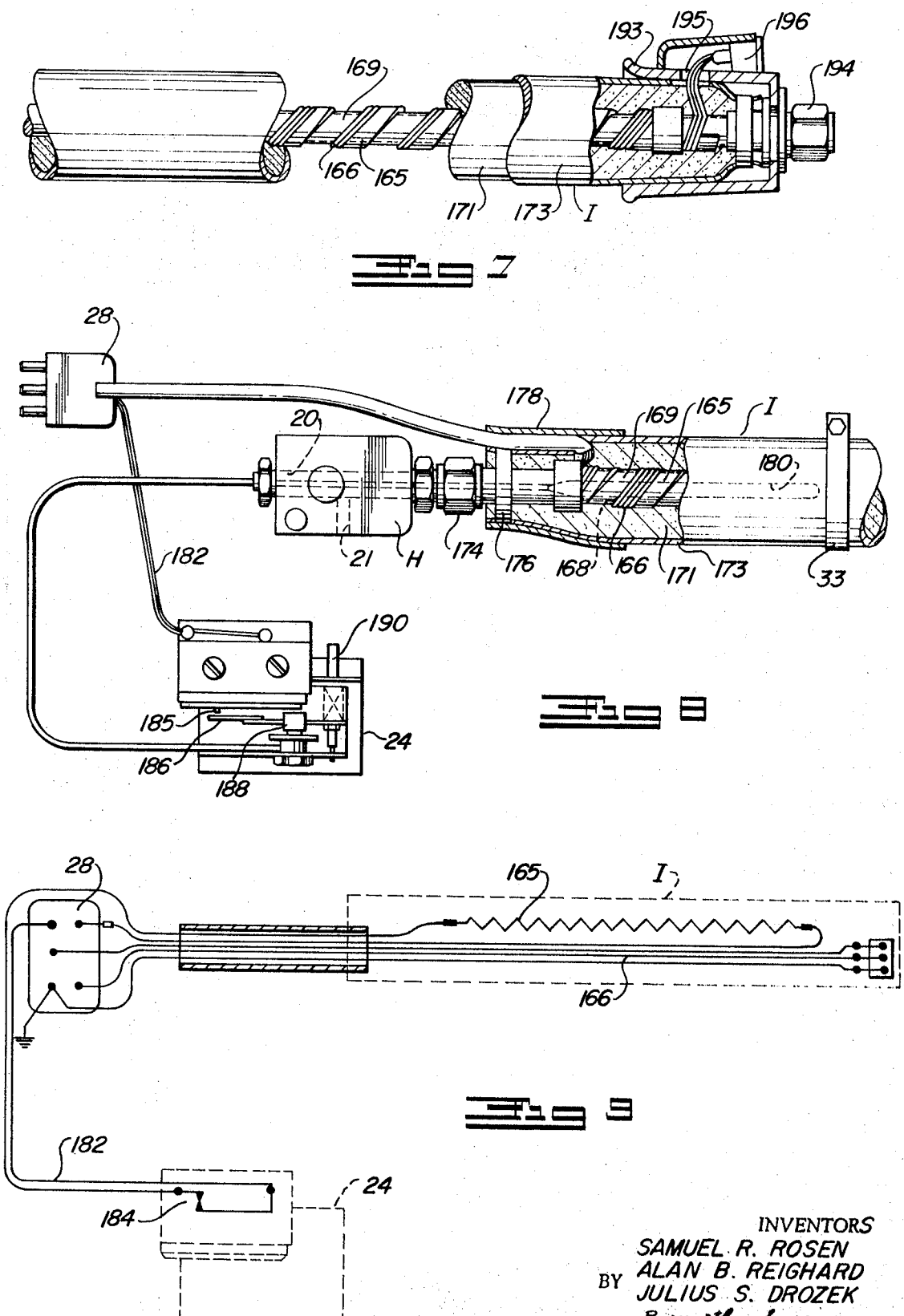

SUPPLY SYSTEM FOR HEATING AND DISPENSING MOLTEN THERMOPLASTIC MATERIAL

BACKGROUND OF THE INVENTION

This invention relates to the dispensing of thermoplastic or viscous material and especially to systems for supplying such materials to an applicator. More particularly, the invention relates to such systems in which solid thermoplastic material is melted in a melting tank and then pumped in liquid form to various kinds of applicators such as hand guns, wheels, or extruding devices, the molten material being maintained molten and at or near its proper application temperature throughout the system from tank to applicator.

Thermoplastic adhesives have many applications in the bonding art including such diverse uses as sealing the tops of cardboard cartons and bonding the joints in fine furniture. The applicator heads and the methods of application differ in the two uses but the problems involved in supplying the applicator head with molten adhesive at the proper application temperature are virtually the same.

The applicator heads must be supplied with a sufficient quantity of clean liquid adhesive at its proper application temperature and normally at a pressure between 50 p.s.i. and 800 p.s.i. The adhesive must be free of particulate matter to prevent clogging of small passages or orifices in the applicator.

Temperature control of the molten adhesive is particularly important. Thermoplastic adhesives now in use suffer degradation as a function of temperature and the time they are subjected to the temperature. At recommended application temperatures degradation proceeds so slowly as to be negligible, but at significantly higher temperatures degradation proceeds very rapidly. Consequently the temperature throughout the supply system must be controlled to prevent "hot spots" in the molten adhesive. Furthermore, the adhesive should be supplied to the applicator at a uniform temperature so that changes in the viscosity of the molten adhesive will not cause changes in the dynamic flow conditions through the applicator thereby causing the applicator to deposit nonuniform amounts of adhesive.

SUMMARY OF THE INVENTION

A general object of this invention is to provide a supply system for thermoplastic or highly viscous materials that solves the problems discussed above. More particular objects are to provide such a system in which thermoplastic material is received in solid form as chunks, pellets, powder, or variously shaped bricks, melted, and supplied under pressure through a filter to an applicator at or near its application temperature.

Other objects are to provide in such a system a sealless pump that is immersed in the thermoplastic material, the thermoplastic material acting as a lubricant and cleaner for the pump.

Still another object is to provide such a system having separately controllable heating means in different portions of the system to maintain close control over the temperature of the thermoplastic material.

Still another object is to provide in such a system a manifold for distributing molten thermoplastic material to a plurality of hoses simultaneously.

Yet another object is to provide in such a system one or more supply hoses that are heated and insulated and within which the thermoplastic material is maintained at or near its application temperature by sensing and controlling the temperature of the material within a predetermined "standard" length of each hose.

A preferred embodiment of our invention comprises a tank and tank heating means for storing thermoplastic material and maintaining it at a predetermined temperature. A pump is immersed vertically in the material within the tank and forces the material into a manifold and through a filter. The manifold has at least one outlet for the material. A hose is coupled to each manifold outlet for carrying material therefrom. Heating means for each hose maintains the material within the hose at a predetermined temperature. An air motor is provided to drive the pump.

BRIEF DESCRIPTION OF THE DRAWINGS

FIG. 1 is a top view, partly in section, of the supply system of this invention with the electrical connections shown diagrammatically.

FIG. 1a is a fragmentary side view of the vertical screen along the line 1a–1a of FIG. 1.

FIG. 2 is a partial sectional view along the line 2–2 of FIG. 1.

FIG. 3 is a partial sectional view along the line 3–3 of FIG. 2 with the filter assembly removed from the filter cavity.

FIG. 4 is an exploded view of the filter assembly.

FIG. 5 is a fragmentary sectional view of the mainfold along the line 5–5 of FIG. 2 showing the filter assembly seated within the filter cavity.

FIG. 6 is a fragmentary sectional view along the line 6–6 of FIG. 5.

FIG. 7 is a partial longitudinal sectional view of the applicator end of a heated supply hose.

FIG. 8 is a plan view, partly in section, of the manifold end of a heated supply hose showing the adapter block and thermostat.

FIG. 9 is a schematic diagram of the electrical wiring to and within a heated supply hose.

DESCRIPTION OF THE PREFERRED EMBODIMENTS

Referring more particularly to the drawings and initially to FIGS. 1, 1a and 2 there is shown a supply system for thermoplastic material including a melting tank A for receiving thermoplastic material in solid form and raising the material to, or slightly below its application temperature. An electrical heating element 10 is cast into the bottom of the tank to provide maximum heat conductivity from the heating element to all parts of the tank. The tank A is preferably made of heavy cast aluminum and includes upwardly projecting fins 12 which increase the area of contact between the tank and the thermoplastic material thereby allowing more heat to be transferred to the material.

A pump B is immersed vertically within the material in the tank and is driven by an air motor C including a four-way valve D that controls the flow of air to motor C as will be described more fully below. Pump B delivers molten thermoplastic material through a passage 13 to a manifold E bolted to the side of the tank A. Manifold E is provided with a vertical filter cavity F which receives a filter assembly G. The molten thermoplastic material is passed through filter assembly G under pressure to remove particulate matter and foreign material generally and flows through passage 14 to a vertical bore 16 from where it is distributed to a plurality of hose adapter blocks H through horizontal connecting passages 17. A drain 19 at the bottom of filter cavity F allows foreign matter to be removed.

Each adapter block H has a longitudinal bore 20 that is intersected by a transverse bore 21 which communicates at its opposite end with a passage 17 from the manifold. Each adapter block is coupled at one end through appropriate fittings to a heated hose I that will be described more fully below. Each hose I is provided with a heating element controlled by a thermostat including a bulb-type sensing element (FIG. 8) which contains a fluid that expands with increasing temperature. A nickel-plated, copper capillary tube 23 (FIGS. 1 and 8) communicates with the open end of the bulb and transmits fluid pressure from the sensing element to a control switch 24 which disconnects power from the hose heating element, all of which will be more fully described below.

Each adapter block and hose is provided with its own bulb-type sensing element as well as its own capillary tube and control switch which are indicated in dashed outline at 25. Each hose and adapter unit is likewise provided with its own electrical wiring which is distributed through a wiring duct 27 from terminal blocks 28. Power is supplied to each terminating block 28 through a master switch panel 30. Each thermostat control switch 24, 25 communicates with its corresponding terminal block 28 to control power to the individual hose heating elements.

A vertical screen 31 bolted at one end to the manifold E extends outwardly alongside hoses I for a short distance. Each hose I is provided with a hose support 33 adjacent the outer end of screen 31. The respective hoses are connected to the screen 31 by the hose supports 33 for a purpose to be described below.

Tank heating element 10 is likewise provided with its own thermostat including a bulb-type sensing element 34, capillary tube 35 and thermostat control switch 36. Power is supplied to the tank heating element 10 through the master switch panel 30. The thermostat for tank heating element 10 is the same as those employed in the heated hoses and except perhaps for the specific temperature setting operates in the identical manner as will be explained more fully below in connection with FIGS. 8 and 9.

PUMP AND AIR MOTOR

The construction of pump B and air motor C is best seen in FIGS. 2 and 3. As shown there, pump B is of the single piston double-acting type that takes in a cylinder full of molten material on the upstroke and discharges one-half the volume on the upstroke and one-half on the downstroke. Pump B includes a housing 39 and a cylinder 40 within which a piston 41 reciprocates. The lower end of cylinder 40 terminates in an inlet 42 closed at its upper end by ball-check 44. Cylinder 40 communicates at its upper end through an outlet 45 with passage 13 which leads to filter cavity F in manifold E.

The lowermost end of piston 41 is interiorly threaded to receive a plug 46 having therein an inlet 47. At its upper end, inlet 47 communicates through a ball-check 49 with a chamber 50 having ports 52 that lead into cylinder 40. A piston rod 54 integral with piston 41 extends upwardly therefrom through cylinder 40 and pump housing 39 and is integrally joined to connecting rod 55 of air motor C.

In operation, assume that the piston 41 is at its lowermost position just beginning an upstroke and that the volume of cylinder 40 not occupied by piston 41 and piston rod 54 is filled with thermoplastic material. Piston 41 as it rises will force the thermoplastic material above it through outlet 45, ball check 49 being held tightly closed by the fluid pressure exerted thereon. Ball-check 44 will move upwardly off its seat in response to the pressure of incoming material seeking to fill the void left by piston 41. When piston 41 has completed its upstroke, cylinder 40 will be filled with thermoplastic material all of which was drawn in on the upstroke. On the downstroke of piston 41 ball-check 44 remains firmly seated while ball-check 49 is moved upwardly off its seat permitting displaced thermoplastic material to move upwardly through inlet 47 and through ports 52 to displace material force through outlet 45.

It will be noted that seals are provided where necessary as, for example, teflon ring 57 at outlet 45 of pump B, but that neither seals nor packing glands are provided between piston 41 and cylinder 40 nor between piston rod 54 and the upper end of cylinder 40. Instead of employing seals, piston 41 is designed to have a close diametrical clearance with the walls of cylinder 40.

The lack of seals is advantageous in several respects. Firstly, the pump can be operated with higher temperature materials since there are no packings to deteriorate from the heat. Likewise, the packing cannot be damaged if the thermoplastic material is inadvertently allowed to solidify while the air motor is still operating. Secondly, the molten thermoplastic material acts as a lubricant for the pump parts, thereby increasing the life of the pump. To further prolong the life of the pump, piston 41 is preferably made of stainless steel and pump housing 39 is made of aluminum that is anodized to reduce wear. Thirdly, the flow of molten material through the unsealed clearances flushes out foreign matter so that the pump tends to be self cleaning.

Air motor C comprises as principal parts a cylinder housing 60 including an upper cylinder head 61 and a lower cylinder head 62. An air piston 64 reciprocates within a cylinder 65 and drives connecting rod 55 which is connected to piston rod 54 of pump B. Connecting rod 55 extends through a seal 66 in lower cylinder head 62.

Air is provided to the upper side of piston 64 through an upper port 68 in upper cylinder head 61 and to the lower side of piston 64 through a port 69 in lower cylinder head 62. Air is directed through the appropriate port by the four-way valve D which includes a valve housing 71 having a longitudinally extending cylindrical passage 72 therein. Passage 72 communicates at its upper end with an upper air chamber 74 and at its lower end with a lower air chamber 75. Upper air chamber 74 terminates in an exhaust port 76 and communicates with cylinder 65 through upper port 68 while lower air chamber 75 terminates in exhaust port 77 and communicates with cylinder 65 through lower port 69.

A splined rod 79 is supported centrally within passage 72 and is connected at each end to a double-acting valve member 81, 82. Each valve member 81, 82 comprises a closure member 83, 84 that is connected to a sealing member 86, 87. Each closure member 83, 84 has an outer sealing surface 88, 89 and an inner sealing surface 90, 91. Each sealing member 86, 87 is preferably a cylindrical washer having a peripheral recess within which is disposed an O-ring 93, 94.

Air pressure is supplied to cylindrical passage 72 through inlet 96 in housing 71 and flows between the splines on rod 79 to upper port 68 or lower port 69 according to the position of valve members 81 and 82. In its uppermost position, outer sealing surface 88 engages seal 97 to close exhaust port 76 while inner sealing surface 91 of lower closure member 84 along with lower sealing member 87 seals the lower end of cylindrical passage 72 and prevents the passage of air into lower air chamber 75. In such case, the path of air is through inlet 96 upwardly between the splines of rod 79 into upper air chamber 74 and through port 68 to force air piston 64 downwardly. Air beneath piston 67 is exhausted through port 69 into lower air chamber 75 and into the atmosphere through exhaust port 77.

In the opposite position of the valve members 81 and 82 upper exhaust port 76 will be open to the atmosphere, the upper end of cylindrical passage 72 will be sealed by valve member 81, lower exhaust port 77 will be sealed by the outer sealing surface 89 of closure member 84, and the lower end of cylindrical passage 72 will be open to lower air chamber 75. In that case, air will flow through inlet 96 downwardly between the splines of rod 79 into lower air chamber 75 and through lower port 69 to drive piston 64 upwardly. The air above piston 64 will be exhausted through port 68 to air chamber 74 and thence into the atmosphere through exhaust port 76.

The position of the double-acting valve members 81 and 82 is determined by the position of a snap action over center mechanism 100 that drives splined rod 79 upwardly or downwardly through a driving rod 101. Over center mechanism 100 includes a fixed U-shaped member 103 bolted to housing 104 as best seen in FIG. 2. Member 103 has two legs 105 and 106 that project horizontally inwardly from housing 104. A movable U-shaped member 108 has one projecting leg 109 pivotally connected to leg 106 of fixed U-shaped member 103. Another leg 110 is suitably fastened to a winged plate 112 having pins 113 and 114 that project toward connecting rod 55. Plate 112 is pivotally connected to leg 105 of the fixed U-shaped member 103 at 116. A pivot pin 118 extends between legs 105 and 106 of the fixed U-shaped member 103. A second pin 119 extends between legs 109 and 110 of movable U-shaped member 108. A helical spring 121 is connected between pin 118 and pin 119. Driving rod 101 terminates at its lowermost end in a link 123 through which extends a pin 124 projecting from leg 109 of movable U-shaped member 108. Connecting rod 55 is provided with a horizontally extending washer 126 for a purpose to be described below.

The operation of the over center mechanism is as follows. As air piston 64 approaches the lowermost end of cylinder 65 connecting rod 55 has been driven downwardly to a point where washer 126 contacts pin 114 causing plate 112 and movable U-shaped member 108 to pivot downwardly about their connection with fixed U-shaped member 103. As movable member 108 is forced downwardly by the action of connecting rod 55, spring 121 is stretched as it pivots about pin 118. As member 108 is driven slightly past the center point of its pivotal rotation the energy stored within spring 121 is released snapping member 108 into its lowermost position which in turn causes pin 124 to contact the lower portion of link 123 and pull driving rod 101 to its lowermost position. The four-way valve D is thus snapped to its lowermost position allowing air to pass through lower port 69 and drive piston 64 upwardly. As the snap action of over center mechanism 100 is completed pin 114 is moved beyond the radial periphery of washer 126 while pin 113 is moved into position to be contacted by washer 126 at the completion of the upstroke of piston 64.

The sequence of operation at the completion of the upstroke of piston 64 is completely analogous to that which occurred at the completion of the downstroke. Overcenter mechanism 100 is snapped into its uppermost position moving four-way valve D to its uppermost position and allowing pressurized air through upper port 68 to initiate the downstroke of piston 64.

The snap action of overcenter mechanism 100 is of great advantage in effecting a rapid transition of four-way valve member D. It should be noted too that the splined rod 79 is designed to have a short stroke in moving from one to the other of its positions which also assists in effecting a rapid transition between valve positions. To modify the long stroke of overcenter mechanism 100 to a short stroke for the splined rod 79 much of the motion of the overcenter mechanism is "lost" by pin 124 in traveling from one position of engagement with link 124 to the other.

MANIFOLD AND FILTER ASSEMBLY

The structure and operation of the manifold and filter assembly can best be understood by referring to FIGS. 2 through 6. The manifold E is constructed as an aluminum block and is bolted to a vertical machined surface at the side of melting tank A as shown in FIG. 1. The intimate contact between the aluminum tank A and the aluminum manifold E provides excellent heat conductivity between the two. A filter cavity F extends downwardly from the tip of the manifold and is adapted to receive a filter assembly G as will be explained more fully below. Filter cavity F communicates through an inlet port 130 and passage 13 with pump outlet 45 as best seen in FIG. 2. The thermoplastic material flows under pressure from the filter cavity inwardly through the filter and emerges therefrom through an outlet 131 which extends from the filter cavity F into the vertical distributing bore 16 of the manifold. From vertical distributing bore 16 molten thermoplastic material flows out of the manifold through one or more outlet passages 17 into transverse bore 21 in the adapter blocks H and through the longitudinal bore 20 in the adapter block to the supply hoses I.

The lower end of the filter cavity F terminates in a drain 19 closed by a plug 133. A pressure relief valve 135 (FIG. 2) communicates at one end with the interior of filter cavity F and at its other end with the interior of melting tank A. If excessive pressure is sensed within filter cavity F valve 135 opens to allow thermoplastic material to flow from filter cavity F back into melting tank A.

The function of relief valve 135 is quite important. As molten thermoplastic material cools it contracts. When the supply system is shut down the relatively small volume of material within filter cavity F cools faster than the larger volume in melting tank A. Contraction of the material in filter cavity F creates a pressure decrease which causes material to flow from tank A into filter cavity F. When the supply system is reactivated the increased amount of expanding material in filter cavity F produces a pressure that must be relieved. Relief valve 140 serves this purpose.

The construction of the filter assembly G and its cooperative connection with filter cavity F is best seen in FIGS. 2, 4, 5 and 6. Filter assembly G comprises three principal parts, a plug member 142, a splined tube 143 and a filter 144. Plug member 142 is threaded as at 146 for engagement with corresponding threads 147 in filter cavity F. Below threaded portion 146 is a peripherally recessed portion 149 which is cross drilled to provide ports 150. Below recessed portion 149 plug 142 increases in diameter as at 152 for sealing engagement with the walls of filter cavity F as seen most clearly in FIGS. 2 and 5. The portion of plug 142 below threads 146 defines a central hollow chamber 153. A shoulder 154 extends radially inwardly into chamber 153.

Splined tube 143 comprises a central steel tube 155 having integral radially projecting splines 156 which extend longitudinally along the tube.

Filter 144 comprises an inner wire cylinder 157 over which is stretched a fine steel wire mesh 158 which serves as a filter medium. The cylinder 157 and mesh 158 are held together at top and bottom by metal clamps 159 and 160, respectively.

The assembled filter assembly is best seen in FIGS. 2 and 5. Splined tube 143 is received snugly within the hollow interior of filter 144. The subassembly of splined tube and filter is then inserted upwardly into chamber 153 of plug 142 so that the upper periphery of clamp 159 seats against shoulder 154. A bolt 162 is inserted through a hole in the bottom clamp 160 of filter 144 and extends through the hollow interior of tube 143 through chamber 153 and threadedly engages a tapped hole 163 in the upper portion of plug 142 thereby holding the filter assembly together.

In operation, molten thermoplastic material enters filter cavity F through inlet 130, flows inwardly under pressure through filter 144 and passes upwardly between splines 156 into chamber 153. Particulate matter or foreign matter of any type will not pass through the filter 144 but will tend to settle to the bottom of filter cavity F from where it can be removed through filter drain 19. From chamber 153 the molten thermoplastic material flows outwardly through ports 150 into the filter cavity and from there through outlet 131 into vertical distributing bore 16 of manifold E as described above.

Having the filter cavity F and filter assembly G extend vertically is of particular importance in the filtering process. In the past filters in many kinds of systems were positioned more or less horizontally and as a result were clogged because filtered matter could not easily settle out of the path of incoming material. In the present system an unobstructed path for natural, gravity induced settling allows the filtered matter to move immediately from the path of incoming material.

Locating the filter on the outlet or high-pressure side of the pump is advantageous in that it permits the use of a finer mesh filter screen to remove smaller particles of foreign matter. In a low pressure environment the filter screen could not be so fine or an excessive pressure drop would occur in the filter. Also, placing the filter at the pump inlet as in some prior systems interferes with the flow of material into the pump and can cause the pump to cavitate.

ADAPTER BLOCK AND HOSE

Referring now to FIGS. 7, 8 and 9 and initially to FIG. 9 the electrical wiring carried by hose I includes resistive heating element 165 and power conductors 166 which are carried by hose I to an applicator (not shown) to, for example, supply power to a heating element within the applicator. Power conductors 166 and the conductors supplying power to heating element 165 are brought in from a terminal block 28 as shown also in FIG. 1. Power to the heating element 165 is routed through thermostat control switch 24 as will be described below.

As shown in FIGS. 7 and 8, hose I comprises a central Teflon hose 168 covered by a stainless steel braid 169 which is surrounded by a thick layer of silicone foam insulation 171. Over the silicone foam 171 is a sleeve of woven material 173 such as Dacron which protects the silicone and makes the entire hose more easily handled by workmen.

As previously described, the molten thermoplastic material enters the adapter block H through transverse bore 21 and flows to hose I through longitudinal bore 30. Teflon hose 168 is coupled to adapter block H through fitting 174. A clamp 176 encircles the Dacron sleeve 173 and compresses the sleeve and silicone foam 171 about Teflon hose 168. The end of the hose is inserted in a cuff 178 of silicone rubber to protect the hose and the incoming wiring from terminal block 28.

Power wiring to be carried by the hose is brought in from terminal block 28 as shown in FIG. 8. Power conductors 166 and resistive heating tape 165 are wound helically about the central Teflon hose 168 over the stainless steel braid 169. Power conductors 166 are provided with Teflon insulation to protect them from the heat generated by heating tape 165.

As noted above, the temperature of the thermoplastic material within the hose I must be controlled to prevent its thermal deterioration. For this purpose, a thermostat is provided including, a bulb-type sensing element 180 which is carried within Teflon hose 168 and senses the temperature of the molten thermoplastic material within, preferably, the first 12 inches of hose I. Sensing element 180 is provided with fluid, for example, xylene which expands in direct proportion to the heat to which it is subjected. A capillary tube 23 is connected to the rearward end of sensing element 180 and passes through fitting 174 and longitudinal bore 20 in adapter block H to a thermostat control switch generally designated 24. A conductor 182 that supplies power to heating tape 165 is routed through thermostat control switch 24 and supplies power to heating tape 165 only when contacts 184 (FIG. 9) of control switch 24 are closed.

Contacts 184 are normally closed but may be opened by moving pin 185 inwardly to separate the contacts. Pin 185 is actuated by arm 186 which pivots about another pin 188 to contact pin 185 in response to an increase in fluid pressure from capillary 23.

So long as the temperature of the molten material within Teflon hose 168 does not exceed a predetermined value the pressure transmitted through capillary tube 23 to control switch 24 is insufficient to move arm 186 into contact with pin 185 so that contacts 184 remain closed and power is supplied to heating tape 165. If the temperature of the material within Teflon hose 168 rises to a point such that the fluid pressure transmitted through capillary 23 is increased to a predetermined value contacts 184 will be opened by pin 185 thereby interrupting power to heating tape 165. A temperature control element 190 on control switch 24 is adjustable to allow the pressure required to cause arm 186 to contact pin 185 to be varied.

A hose support 33 is adapted to be connected to a vertical screen 31 (FIGS. 1 and 1a) preferably at the point along hose I where bulb-type sensing element 180 ends. By supporting hose I in such a manner bulb-type sensing element 180 is prevented from being damaged by excessive sagging or bending of hose I. More importantly the supported portion of hose I from adapter block H to hose support 33 is suspended in freely circulating air and may serve as a representative or standard length of hose. Note that air may circulate about the suspended portion of the hose through screen 31. Since the ambient conditions and the heat supplied to the suspended portion of the hose are representative of the entire hose the temperature sensed and controlled within the suspended portion may be taken as very nearly that of the entire length of hose.

The temperature of the molten materials within hose I ranges from 200° F. to 400° F. depending upon the particular thermoplastic material in use. In any case it is preferred that the temperature of the material within the melting tank A be maintained no greater than that within the hose I so that the temperature of the material coming from the tank A will not dominate the temperature of the material within the hoses I.

As shown in FIG. 7 the applicator end of hose I is inserted into a cuff 193 through which Teflon hose 168 emerges to be connected to a swivel fitting 194 which in turn connects to an applicator. Power conductors 166 are routed through an opening 195 in cuff 193 and terminate in a socket 196. Socket 196 may then receive a mating plug to, for example, conduct power to a heating element in an applicator. Swivel fitting 194 and a gun-type applicator for dispensing molten thermoplastic material are described in application Ser. No. 808,727 filed Mar. 20, 1969 and assigned to the assignee of this invention.

While we have shown and described one illustrative embodiment of this invention, it is to be understood that the concepts thereof could be employed in other embodiments without departing from the spirit and scope of the invention. Accordingly we do not wish to be limited to the form of our invention herein specifically disclosed nor in any other manner inconsistent with the progress in the art which our invention has promoted.

We claim:

1. A system for supplying molten thermoplastic material to an applicator comprising a tank for storing thermoplastic material, electrical heating means attached to said tank for maintaining said material at a first predetermined temperature, a pump immersed vertically in said material within said tank for supplying pressure to force said material through said system, said pump having an inlet and an outlet for thermoplastic material and including a cylinder and a piston that reciprocates within said cylinder, means for driving said pump including an air motor having a cylinder and an air piston that reciprocates within said cylinder, a connecting rod extending between said air piston and said pump piston, two-position valve means for directing air to said air cylinder to move said air piston in a direction dependent upon the position of said valve means, an overcenter mechanism for positioning said valve means, means carried by said connecting rod for actuating said overcenter mechanism near the end of each stroke of said air piston. whereby said valve means is repositioned to cause a change in the direction of movement of said air piston, a manifold having an inlet in communication with said pump outlet, and at least one outlet, filter means within said manifold between said inlet and said outlet for filtering said thermoplastic material supplied thereto under pressure, hose means coupled to said manifold outlet for carrying thermoplastic material to said applicator, and electrical hose heating means attached to said hose means for maintaining said material within said hose means at a second predetermined temperature.

2. The system of claim 1, wherein said overcenter mechanism includes resilient means for snapping said valve means into position.

3. A system for supplying molten thermoplastic material to an applicator comprising a tank for storing thermoplastic material, electrical heating means attached to said tank for maintaining said material at a first predetermined temperature, a pump immersed in said material within said tank for supplying pressure to force said material through said system, said pump having an inlet and an outlet for thermoplastic material, means for driving said pump, hose means for carrying thermoplastic material to said applicator, means for carrying thermoplastic material from said pump outlet to said hose means, an electrical heating element attached to said hose means for supplying heat to said hose means throughout its length, and thermostat means for said hose means including a temperature sensing element disposed in the fluid passageway within said hose means for sensing the temperature of said material within a predetermined length of said hose means to provide a temperature standard for the entire length of said hose means.

4. The system of claim 3 further comprising means for maintaining said predetermined length of said hose means exposed to ambient temperature conditions whereby it may represent the temperature of the entire length of said hose means.

5. The system of claim 3 wherein said means for carrying thermoplastic material from said pump outlet to said hose means includes a manifold having an inlet in communication with said pump outlet, and at least one outlet, and a filter disposed within said manifold between said inlet and said outlet, said hose means being coupled to said manifold outlet for carrying thermoplastic material to said applicator.

6. The system of claim 3 wherein said pump includes a cylinder and a piston that reciprocates within said cylinder, and said means for driving said pump comprises an air motor including a cylinder and an air piston that reciprocates within said cylinder, a connecting rod extending between said air piston and said pump piston, two-position valve means for directing air to said air cylinder to move said air piston in a direction dependent upon the position of said valve means, an overcenter mechanism for positioning said valve means, and means carried by said connecting rod for actuating said overcenter mechanism near the end of each stroke of said air piston, whereby said valve means is repositioned to cause a change in the direction of movement of said air piston.

7. The system of claim 6 wherein said overcenter mechanism includes resilient means for snapping said valve means into position.

8. A system for supplying molten thermoplastic material to an applicator comprising a tank for storing thermoplastic material, electrical heating means attached to said tank for maintaining said material at a first predetermined temperature, a pump immersed in said material within said tank for supplying pressure to force said material through said system, said pump having an inlet and an outlet for thermoplastic material, means for driving said pump, a manifold having an inlet in communication with said pump outlet, and at least one outlet, filter means within said manifold between said inlet and said outlet for filtering said thermoplastic material supplied thereto under pressure, hose means coupled to said manifold outlet for carrying thermoplastic material to said applicator, an electrical heating element attached to said hose means for supplying heat to said hose means throughout its length, thermostat means for said hose means including a temperature sensing element disposed in the fluid passageway within said hose means for sensing the temperature of said material within a predetermined length of said hose means to provide a temperature standard for the entire length of said hose means, and means for maintaining said predetermined length of said hose means for maintaining said predetermined length of said hose means exposed to ambient temperature conditions whereby it may represent the temperature of the entire length of said hose means.

Disclaimer 3,585,361.—*Samuel R. Rosen*, Lorain, *Alan B. Reighard*, Bay Village, and *Julius S. Drozek*, Lorain, Ohio. SUPPLY SYSTEM FOR HEATING AND DISPENSING MOLTEN THERMOPLASTIC MATERIAL. Patent dated June 15, 1971. Disclaimer filed Jan. 6, 1972, by the assignee, *Nordson Corporation*.

Hereby enters this disclaimer to claims 1 and 2 of said patent.

[*Official Gazette July 25, 1972.*]